US011639243B2

(12) United States Patent
Scarabelli et al.

(10) Patent No.: US 11,639,243 B2
(45) Date of Patent: May 2, 2023

(54) SYSTEM AND METHOD FOR CONTROLLING A MANUFACTURING PROCESS FOR PACKAGING UNITS

(71) Applicant: Tetra Laval Holdings & Finance S.A., Pully (CH)

(72) Inventors: Paolo Scarabelli, Reggio Emilia (IT); Antonio Marsella, Bologna (IT); Lorenzo Tacconi, Modena (IT); Antonio Melandri, Rubiera (IT); Marco Melandri, Bologna (IT); Matteo Gazzadi Poggioli, Modena (IT); Stefano Vicini, Vignola (IT); Claudio Donati, Modena (IT); Mattia Verasani, San Martiono in Rio (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 17/282,189

(22) PCT Filed: Sep. 30, 2019

(86) PCT No.: PCT/EP2019/076425

§ 371 (c)(1),
(2) Date: Apr. 1, 2021

(87) PCT Pub. No.: WO2020/070057

PCT Pub. Date: Apr. 9, 2020

(65) Prior Publication Data

US 2022/0144471 A1 May 12, 2022

(30) Foreign Application Priority Data

Oct. 2, 2018 (EP) .................................... 18198198

(51) Int. Cl.
| | | |
|---|---|---|
| *B65B 57/00* | (2006.01) | |
| *B65B 61/02* | (2006.01) | |
| *B65B 57/02* | (2006.01) | |
| *B65B 9/08* | (2012.01) | |
| *B65B 41/18* | (2006.01) | |

(Continued)

(52) U.S. Cl.
CPC ............... *B65B 57/02* (2013.01); *B65B 9/08* (2013.01); *B65B 41/18* (2013.01); *B65B 57/00* (2013.01);
(Continued)

(58) Field of Classification Search
CPC ........ G05B 2219/45048; B65B 61/025; B65B 2210/04; B65B 3/025
See application file for complete search history.

(56) References Cited

U.S. PATENT DOCUMENTS 5,069,021 A * 12/1991 Reil .................... B65B 3/025
53/563
7,050,938 B1 * 5/2006 Prater ................. G06Q 10/087
702/182

(Continued)

FOREIGN PATENT DOCUMENTS

| EP | 1266830 A1 * | 12/2002 | ............. B65B 57/00 |
| FR | 3063367 | 8/2018 | |
| WO | WO2017/114666 | 7/2017 | |

OTHER PUBLICATIONS

International Search Report and Written Opinion issued in PCT/EP2019/076425 dated Dec. 20, 2019.

*Primary Examiner* — Joshua G Kotis
(74) *Attorney, Agent, or Firm* — Knobbe, Martens, Olson & Bear, LLP

(57) ABSTRACT

A system for controlling a manufacturing process for packaging units is disclosed, the packaging units are manufactured from a packaging material comprising machine readable identifiers. A control unit associates the identifiers with corresponding data images of the packaging units, wherein (Continued)

for a first process application to manipulate packaging material based on a first set of process parameters, the control unit is configured to store at least part of the first set of process parameters to the associated data image, wherein for a subsequent second process application to manipulate said packaging material, read at least part of the first set of process parameters stored in said associated data image to control the second process application based on at least part of the first set of process parameters.

14 Claims, 5 Drawing Sheets

(51) Int. Cl.
    *B65B 59/00*     (2006.01)
    *G05B 19/418*     (2006.01)

(52) U.S. Cl.
    CPC .......... *B65B 59/00* (2013.01); *G05B 19/4183* (2013.01); *B65B 61/025* (2013.01); *G05B 2219/31424* (2013.01); *G05B 2219/45048* (2013.01)

(56) References Cited

U.S. PATENT DOCUMENTS

| | | | |
|---|---|---|---|
| 9,361,550 B2* | 6/2016 | Barros | G06K 7/1447 |
| 9,409,711 B1* | 8/2016 | Hanssen | G06Q 10/087 |
| 2007/0298147 A1* | 12/2007 | Haus | A22C 17/10 |
| | | | 426/232 |
| 2014/0290180 A1 | 10/2014 | Olbrich | |
| 2015/0102100 A1* | 4/2015 | Hattrup | G06K 1/121 |
| | | | 53/64 |
| 2015/0264319 A1* | 9/2015 | Wood | H04N 7/181 |
| | | | 348/125 |
| 2015/0353214 A1* | 12/2015 | Gerstner | B65B 9/045 |
| | | | 53/131.5 |
| 2016/0251101 A1* | 9/2016 | Kong | B65B 57/10 |
| | | | 53/445 |
| 2019/0009940 A1* | 1/2019 | Scarabelli | B65B 55/08 |
| 2019/0168903 A1* | 6/2019 | Green | G06F 3/048 |
| 2020/0219112 A1* | 7/2020 | Nakayama | G05B 19/418 |
| 2020/0226537 A1* | 7/2020 | Tsugawa | B65B 61/02 |

* cited by examiner

SYSTEM AND METHOD FOR CONTROLLING A MANUFACTURING PROCESS FOR PACKAGING UNITS

TECHNICAL FIELD

The present invention generally relates to the field of process control in manufacturing lines. More particularly, the present invention relates to a system for controlling a manufacturing process for packaging units such as packaging containers for food, and a related method for controlling such manufacturing process.

BACKGROUND

Process control is critical in production lines, such as in the manufacturing of sealed packaging containers for liquid- or semi liquid food in a filling machine or related systems for the production and handling of such packaging containers, in order to attain a desired performance. Since the latest generations of filling machines or related apparatuses employed for the production of sealed packaging containers operate at very high speeds to further increase the throughput of the production line, it is in some situations cumbersome to accurately characterize and optimize all aspects of the performance of the package container production, especially without significantly increasing the amount of resources for such optimization or disrupting the production line. This may lead to sub-optimal performance or lowered throughput. A problem is thus how to implement a reliable process control with a minimum impact on the production while requiring a minimum amount of resources.

SUMMARY

It is an object of the invention to at least partly overcome one or more limitations of the prior art. In particular, it is an object to provide an improved system and method for controlling a manufacturing process for packaging units for food, and in particularly allowing for avoiding more of the above-mentioned problems and compromises, including providing for facilitated control over process parameters across the entire manufacturing chain, with improved monitoring and control of deviations from a desired performance.

In a first aspect of the invention, this is achieved by a method of controlling a manufacturing process for packaging units for food, comprising providing machine readable identifiers on a packaging material for the packaging units, associating the identifiers with corresponding data images of the packaging units, whereby for a series of packaging units, to be manufactured from a corresponding series of packaging material, each packaging unit in the series has a corresponding data image being identifiable by an associated identifier on the packaging material thereof. For a first process application to manipulate a packaging material from which a first packaging unit is manufactured based on a first set of process parameters, the method comprises registering a first identifier on said packaging material to be manipulated to identify the associated data image, storing at least part of the first set of process parameters to the associated data image. For a subsequent second process application to manipulate said packaging material from which the first packaging unit is manufactured, the method comprises registering the first identifier to identify the associated data image, reading at least part of the first set of process parameters stored in said associated data image to control the second process application based on at least part of the first set of process parameters.

In another aspect of the invention, this is achieved by a system for controlling a manufacturing process for packaging units for food, wherein the packaging units are manufactured from a packaging material comprising machine readable identifiers. The system comprises a control unit configured to associate the identifiers with corresponding data images of the packaging units, whereby for a series of packaging units, to be manufactured from a corresponding series of packaging material, each packaging unit in the series has a corresponding data image being identifiable by an associated identifier on the packaging material thereof. For a first process application to manipulate a packaging material from which a first packaging unit is manufactured based on a first set of process parameters, the control unit is configured to register a first identifier on said packaging material to be manipulated to identify the associated data image, store at least part of the first set of process parameters to the associated data image. For a subsequent second process application to manipulate said packaging material from which the first packaging unit is manufactured, the control unit is configured to register the first identifier to identify the associated data image, read at least part of the first set of process parameters stored in said associated data image to control the second process application based on at least part of the first set of process parameters.

In a third aspect of the invention, this is achieved by a computer program product comprising instructions which, when the program is executed by a computer, cause the computer to carry out the steps of the method according to the first aspect.

In a fourth aspect of the invention, this is achieved by a packaging machine performing the steps of the method according to the first aspect, or comprising a system according to the second aspect.

Further examples of the invention are defined in the dependent claims, wherein features for the first aspect may be implemented for the second and subsequent aspects, and vice versa.

Further examples of the invention are defined in the dependent claims, wherein features for the first aspect may be implemented for the second aspect, and vice versa.

Associating the packaging units with corresponding data images and storing process parameters to each unique data image to be subsequently utilized for controlling manipulation of each unique unit in a process application further downstream in the line allows for dynamically varying and optimizing the process parameters across the manufacturing line for each packaging unit taking into account each unique characteristic thereof.

Still other objectives, features, aspects and advantages of the invention will appear from the following detailed description as well as from the drawings.

DRAWINGS

Embodiments of the invention will now be described, by way of example, with reference to the accompanying schematic drawings.

DETAILED DESCRIPTION

Embodiments of the invention will now be described more fully hereinafter with reference to the accompanying drawings, in which some, but not all, embodiments of the invention are shown. The invention may be embodied in many different forms and should not be construed as limited to the embodiments set forth herein.

Figure 1:
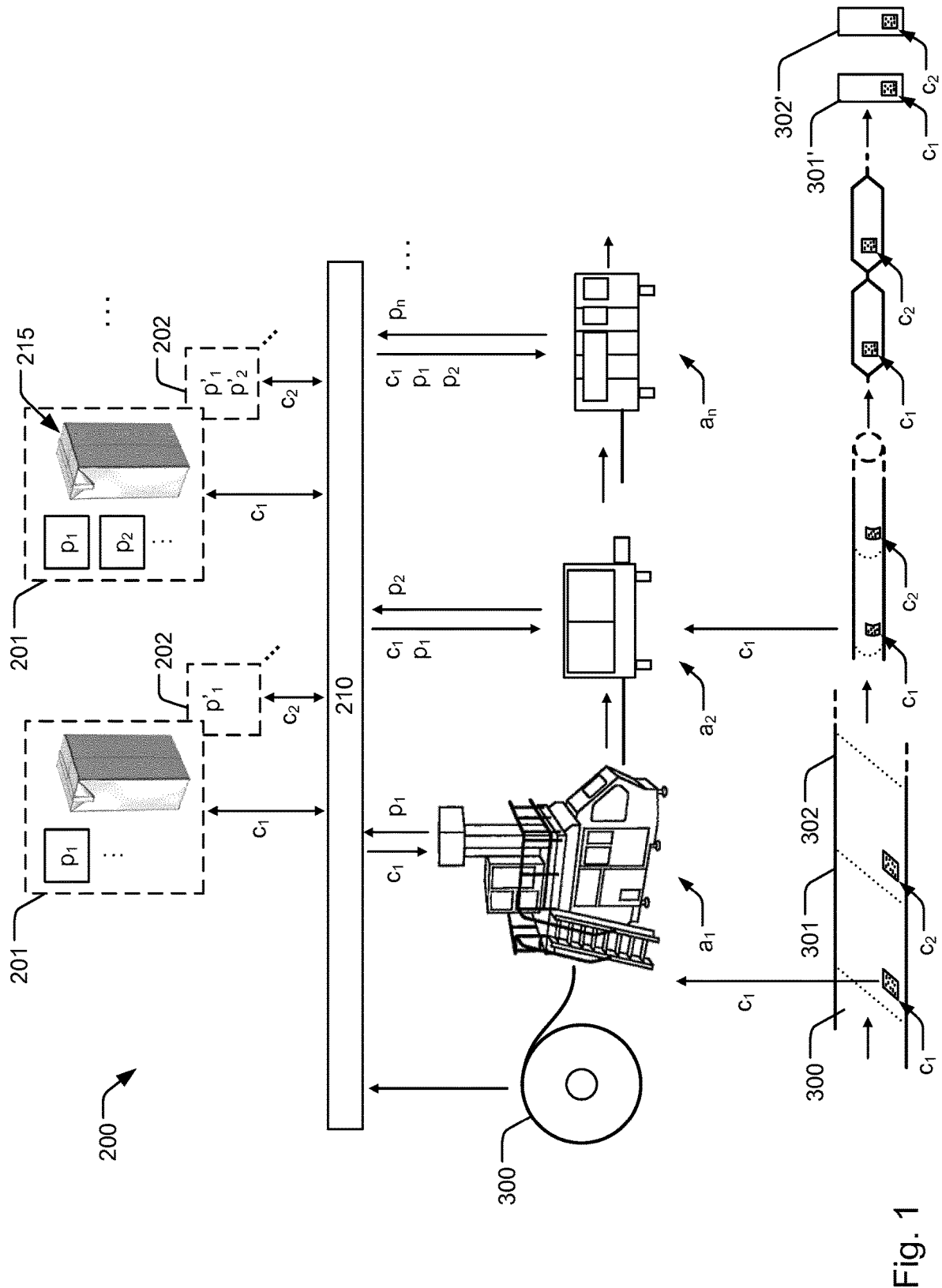
FIG. 1 is a schematic illustration of a system for controlling a manufacturing process for packaging units.
Figure 2:
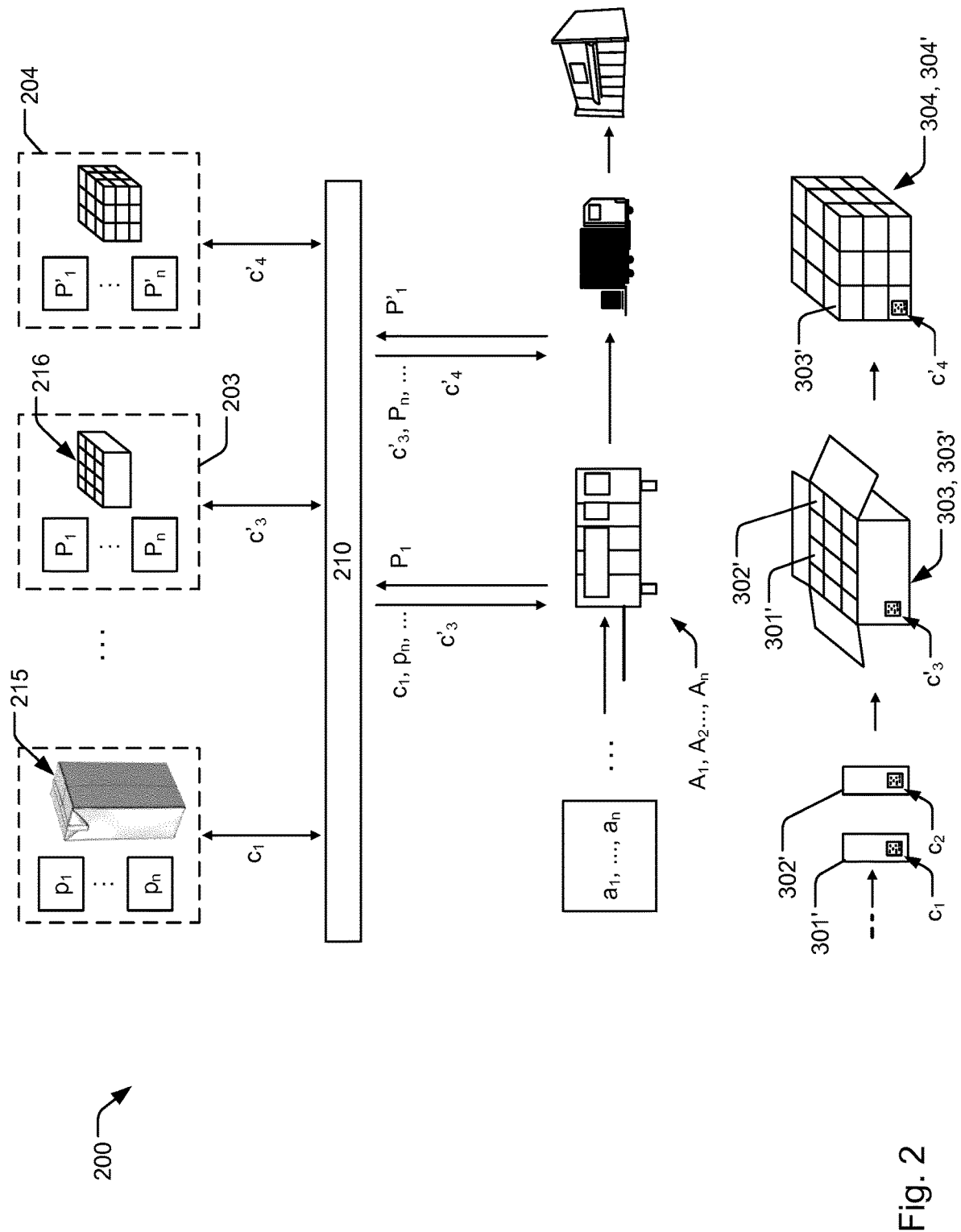
FIG. 2 is a schematic illustration of a system for controlling a manufacturing process for packaging units.

FIGS. 1 and 2 are schematic illustrations of examples of a system 200 for controlling a manufacturing process for packaging units 301', 302', 303', 304', for food. FIG. 1 is an example of part of a production line where packaging units or containers 301', 302', are manufactured from a continuous sheet 300 of packaging material 301, 302, on a reel. The sheet 300 is formed into a tube, sealed in a longitudinal direction, filled with food content, sealed in a transverse direction and finally separated into individual units 301', 302'. FIG. 2, as described further below, is an example of part of a production line wherein the aforementioned individual packaging units 301', 302', are combined as aggregates of packaging units 303', 304', which may comprise secondary packaging materials. It should be understood that FIGS. 1 and 2 are selected examples and that the system 200 and method 1000 with the below described advantageous benefits apply to further examples of production lines or parts of production lines for various types of packaging units.

Figure 3:
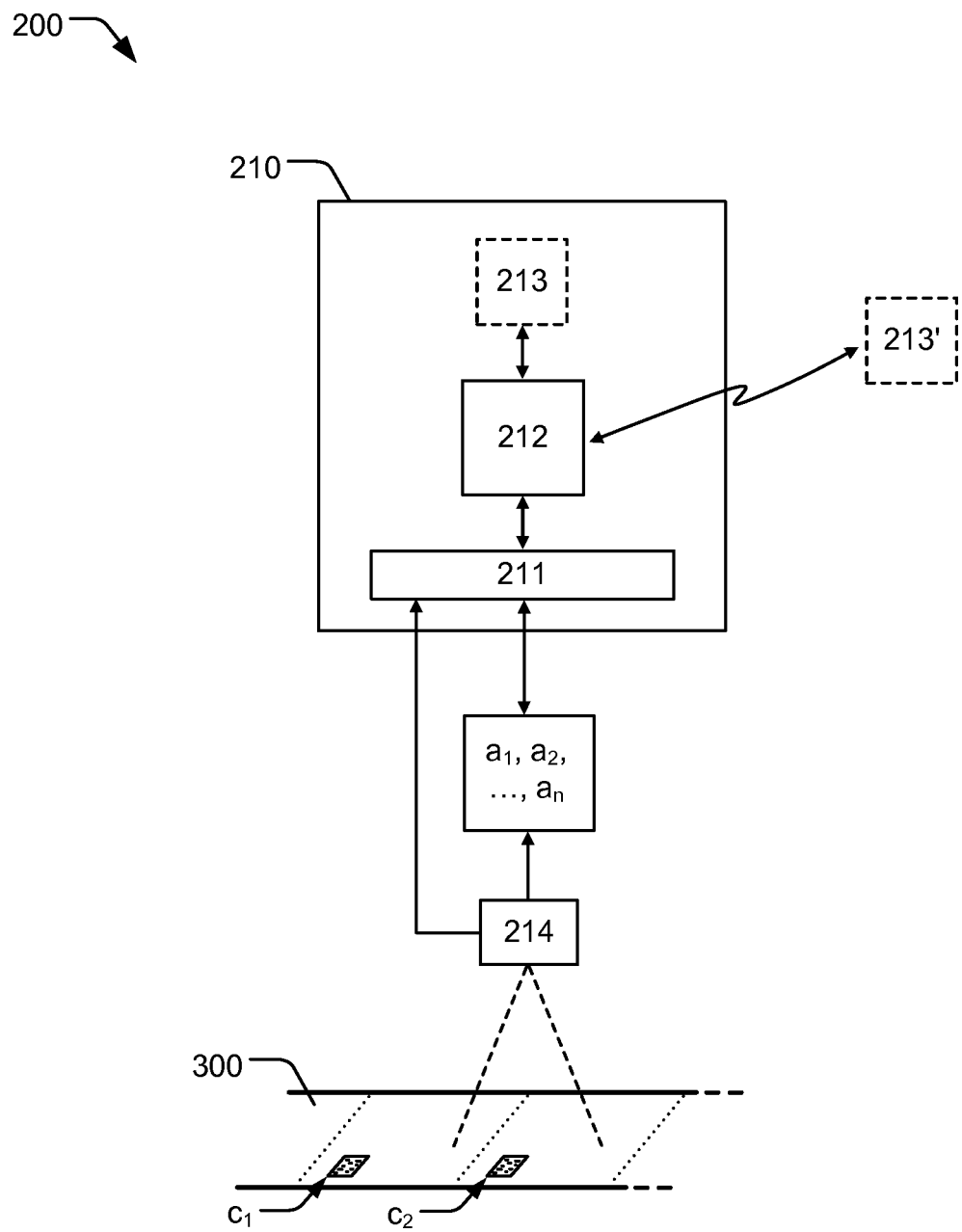
FIG. 3 is a schematic illustration of a system for controlling a manufacturing process for packaging units.
Figure 4A:
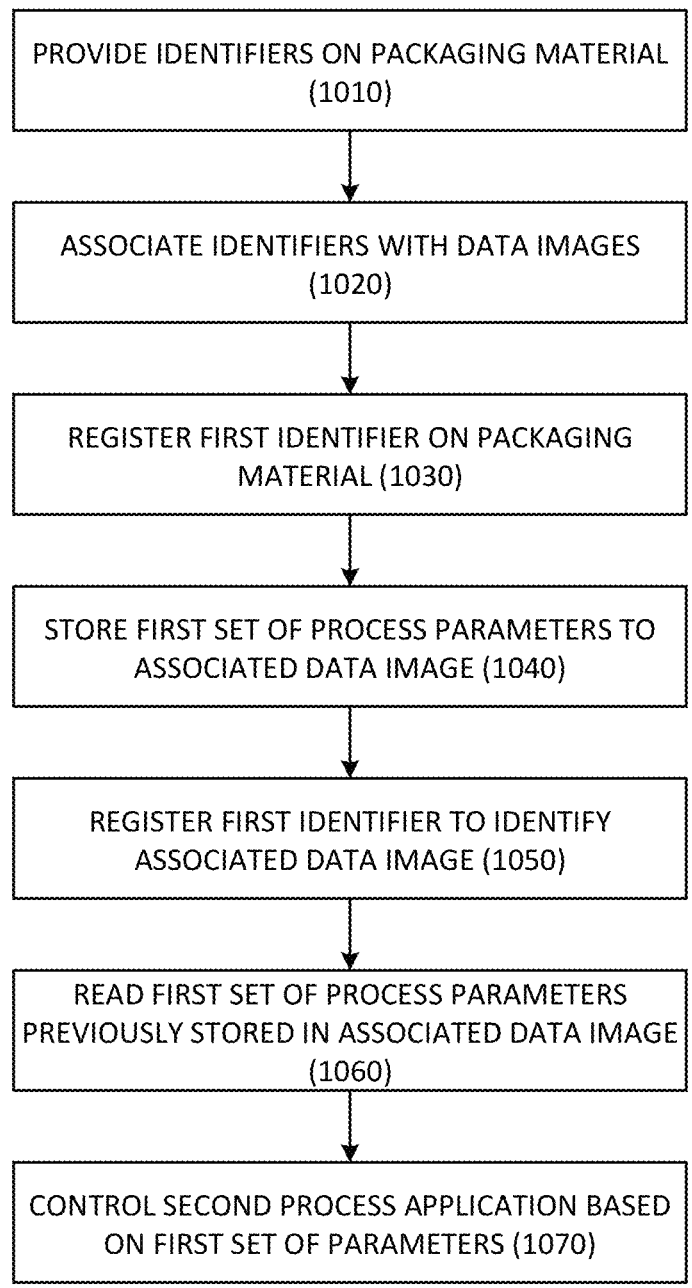
FIG. 4a is a flowchart of a method of controlling a manufacturing process for packaging units.

Turning again to FIG. 1, in conjunction with the flowchart of FIG. 4a, the packaging units 301', 302', are manufactured from a packaging material 301, 302, comprising machine readable identifiers ($c_1$, $c_2$). Thus, each section 301, 302, of the continuous sheet of packaging material 300 that will be formed into a corresponding packaging unit 301', 302', is identifiable by a unique identifier ($c_1$, $c_2$). The system 200 comprises a control unit 210 configured to associate 1020 the identifiers ($c_1$, $c_2$) with corresponding data images 201, 202, of the packaging units 301', 302'. Hence, for a series of packaging units 301', 302', to be manufactured from a corresponding series of packaging material 301, 302, each packaging unit 301', 302', in the series has a corresponding data image 201, 202, being identifiable by an associated identifier ($c_1$, $c_2$) on the packaging material 301, 302, thereof. The data images 201, 202, may be stored in a memory on a server, or locally, as described further in relation to FIG. 3. FIG. 1 only illustrates two data images 201, 202, for two different packaging units 301', 302', for the purpose of a clear presentation but it should be understood that a plurality of such data images can be created for each packaging units. FIG. 1 shows a first process application ($a_1$) to manipulate the packaging material 301, from which a first packaging unit 301' is manufactured, based on a first set of process parameters ($p_1$). The control unit 210 is configured to register 1030 a first identifier ($c_1$) on the packaging material 301 to be manipulated to identify the associated data image 201. I.e. as the packaging material 301 is received in the first application ($a_1$), the first identifier ($c_1$) is detected and communicated to the control unit 210 which accesses the data image 201 corresponding to the first packaging unit 301' based on the unique identity defined by the first identifier ($c_1$). The first application ($a_1$) is controlled by the first set of process parameters ($p_1$) to manipulate the packaging material 301. The control unit 201 is configured to store 1040 at least part of the first set of process parameters ($p_1$) to the associated data image 201. As described further below, the first set of process parameters ($p_1$) may comprise various data relating to the process of the first application ($a_1$), e.g. machine settings, environment data, or any other mechanical, physical, or chemical characteristics obtained during the process of the first application ($a_1$) from e.g. sensor data. The first set of process parameters ($p_1$) may also comprise any characteristics of the packaging material 301 itself, such as material composition, dimensions etc. FIG. 1 shows a subsequent second process application ($a_2$) to manipulate the packaging material 301, from which the first packaging unit 301' is manufactured. The control unit 210 is configured to register 1050 the first identifier ($c_1$) to identify the associated data image 201. I.e. the unique data image 201 of the first packaging unit 301' is again accessed further downstream in the manufacturing line at second process application ($a_2$). As the section of packaging material 301 is received in the second process application ($a_2$), the control unit 210 receives the associated identifier ($c_1$) data and accesses the data image 201 corresponding to the first packaging unit 301'. The control unit 210 is configured to read 1060 at least part of the first set of process parameters ($p_1$) previously stored in the associated data image 201 to control 1070 the second process application ($a_2$) based on at least part of the first set of process parameters ($p_1$). For example, any variations in the first set of process parameters ($p_1$) recorded for a particular packaging unit 301 in its associated data image 201 may be subsequently compensated and optimized for when the identified packaging unit 301 is manipulated in the second process application ($a_2$). The system 200 thus provides for a continuous evaluation and optimization of subsequent manipulation steps throughout the production line by the continuous and real-time recording and retrieving of dynamic process data from the digital images 201, 202, of each packaging unit 301', 302'. This allows for an autonomous optimization on individual packaging container level, which provides for minimizing deviations from desired quality goals while alleviating resources required for sustaining such quality goals.

In one example, process parameters ($p_1$) may be stored to a particular data image 201 in the first process application ($a_1$) which are indicative of mechanical deviation of the associated packaging unit 301'. The aforementioned data is then accessible in a subsequent process application ($p_2$) which may discard the particular packaging unit 301' or adapt its control or process parameters ($p_2$) to compensate for the deviation. E.g., the mechanical, physical, or chemical characteristics of the packaging material 301, 302, or packaging units 301', 302', can be taken into account for such compensation. In another example, in case any part of the manufacturing line has been temporarily interrupted, e.g. during a calibration process or a maintenance routine, any of the process parameters ($p_1$) may have been affected. By accessing the data images 201, 202, the process applications ($a_2$) may compensate for the affected process parameters ($p_1$) once the production is resumed. Associating the packaging units with corresponding data images and storing process parameters to each unique data image to be subsequently utilized for controlling manipulation of each unique unit in a process application further downstream in the line hence allows for dynamically varying and optimizing the process parameters across the manufacturing line for each packaging unit taking into account each unique characteristic thereof.

The process applications ($a_1$, $a_2$) as discussed may relate to any part of the manufacturing chain, such as forming and preparing the packaging material for different sealing operations, as well as filling the packaging units 301', 302', with content and providing any additional components onto the packaging units 301', 302', such as caps, straws etc. Process applications ($a_1$) which introduce the filler product also provides for updating the unique data images 201, 202, with associated process parameters ($p_1$), such as filler product information, e.g. general data relating to the type of product, as well as dynamic individual data, e.g. temperature variations in the filling step. Related process applications ($a_2$) can access the data images 201, 202, to optimize the application parameters ($p_2$). E.g. air pressure inside a packaging unit 301' can be optimized during filling of a product for a particular type of material 301 where the mechanical characteristics thereof is stored in the first set of process parameters ($p_1$).

The principles described in relation to FIG. 1 and the associated advantages of the system 200 applies correspondingly to example of FIG. 2. In FIG. 2, another example of a production line is shown, where process applications ($A_1$, $A_2$) combine individual packaging units 301', 302', as aggregates of packaging units 303', 304', which may comprise secondary packaging materials 303, 304. E.g. a packaging unit or container 303', formed from packaging material 303, may store a plurality of packaging units 301'. Several packaging units or containers 303' may be combined in another packaging unit or pallet 304'. In either case, the packaging units 303', 304', or packaging material 303, 304, thereof comprises machine readable identifiers ($c'_3$, $c'_4$).

The control unit 210 is configured to associate 1020 the identifiers ($c'_3$, $c'_4$) with corresponding data images 203, 204, of the packaging units 303', 304'. Thus, each packaging unit 303', 304', has a corresponding data image 203, 204, being identifiable by an associated identifier ($c'_3$, $c'_4$). A first process application ($A_1$) manipulates the packaging material 303 from which a first packaging unit 303' is manufactured based on a first set of process parameters ($P_1$). The control unit 210 is configured to register 1030 a first identifier ($c'_3$) on the packaging material 303 to be manipulated to identify the associated data image 203, and store 1040 at least part of the first set of process parameters ($P_1$) to the associated data image 203. For a subsequent second process application ($A_2$) to manipulate said packaging material 303, the control unit 210 is configured to register 1050 the first identifier ($c'_3$) to identify the associated data image 203, and read 1060 at least part of the first set of process parameters ($P_1$) stored in said associated data image 203 to control 1070 the second process application ($A_2$) based on at least part of the first set of process parameters ($P_1$). As described in relation to FIG. 1, the data images 203 are enriched with process parameters ($P_1$, $P_2$) of the process applications ($A_1$, $A_2$). Thus, the process parameters ($P_1$, $P_2$) are accessible in the data images 203 for each unique packaging unit 303' to dynamically control subsequent process applications ($A_n$), allowing for continuously and autonomously compensating and optimizing the manufacturing line. The process applications ($A_n$) for a packaging unit 303' of a secondary packaging material 303 may be controlled based on control instructions comprising process parameters ($P_n$) as well as process parameters ($p_1$) of the individual packaging units 301'. In one example the latter process parameters ($p_1$) may comprise data of the dimensions of the individual units 301', which can be used as input to a subsequent process application ($A_n$) to adjust the dimensions of the secondary packaging material 303 accordingly. The data images 203, 204, may be enriched with new data throughout the entire manufacturing chain, including the distribution steps. Hence, in addition to provide for continuously evaluating and optimizing of the packaging units 301', 303', 304', on respective individual basis in real-time during the manufacturing steps, it is provided for improved post-manufacturing analysis based on comprehensive data sets. This allows for further optimization and on a multitude of process levels, such performance of complete manufacturing lines, aggregates of processes, as well as traceability to individual processes or parts of machines.

FIG. 4a is a flow chart of the overall method 1000 for controlling a manufacturing process for packaging units 301', 302', 303', 304', for food. The method 1000 comprises providing 1010 machine readable identifiers ($c_1$, $c_2$, $c'_3$, $c'_4$) on a packaging material 301, 302, 303, 304, for the packaging units. The method 1000 comprises associating 1020 the identifiers with corresponding data images 201, 202, 203, 204, of the packaging units, whereby for a series of packaging units, to be manufactured from a corresponding series of packaging material 301, 302, 303, 304, each packaging unit 301', 302', 303', 304', in the series has a corresponding data image 201, 202, 203, 204, being identifiable by an associated identifier ($c_1$, $c_2$, $c'_3$, $c'_4$) on the packaging material 301, 302, 303, 304, thereof. For a first process application ($a_1$, $A_1$) to manipulate a packaging material 301, 303, from which a first packaging unit 301', 303', is manufactured based on a first set of process parameters ($p_1$, $P_1$), the method 1000 comprises registering 1030 a first identifier ($c_1$, $c'_3$) on said packaging material 301, 303, to be manipulated to identify the associated data image 201, 203, and storing 1040 at least part of the first set of process parameters ($p_1$, $P_1$) to the associated data image. For a subsequent second process application ($a_2$, $A_2$) to manipulate said packaging material 301, 303, from which the first packaging unit 301', 303', is manufactured, the method comprises registering 1050 the first identifier ($c_1$, $c'_3$) to identify the associated data image 201, 203, and reading 1060 at least part of the first set of process parameters ($p_1$, $P_1$) stored in said associated data image 201, 203, to control 1070 the second process application ($a_2$, $A_2$) based on at least part of the first set of process parameters ($p_1$, $P_1$).

Turning to FIG. 3, the control unit 210 may comprise a communication interface 211 configured to communicate with the first and second process applications ($a_1$, $a_2$, $A_1$, $A_2$), and to receive identifier data comprising said identifier ($c_1$, $c_2$, $c'_3$, $c'_4$). The control unit 210 may comprise a processor 212 connected to the communication interface 211 to associate the identifier ($c_1$, $c_2$, $c'_3$, $c'_4$) with the corresponding data image 201, 202, 203, 204, stored in a memory 213, 213', which may be accessible on a remote server or locally. Thus, the communication interface 211 may be configured to receive at least part of the first set of process parameters ($p_1$, $P_1$) mentioned above from the first process application ($a_1$, $A_1$), and the processor 212 may be configured to store at least part of the first set of process parameters ($p_1$, $P_1$) to the data image 201, 203, of an associated first packaging unit 301', 303'. For the subsequent second process application ($a_2$, $A_2$), the processor 212 may be configured to read at least part of the first set of process parameters ($p_1$, $P_1$) stored in the aforementioned data image 201, 203, and send control instructions to the second process application ($a_2$, $A_2$) for manipulation of the packaging material 301, 303, associated with said data image 201, 203, based on at least part of the first set of process parameters ($p_1$, $P_1$).

The system 200 may comprise an image detector 214 in communication with the control unit 210. The image detector may be configured to register image data of the packaging material 301, 302, 303, 304, to detect the machine readable identifiers ($c_1$, $c_2$, $c'_3$, $c'_4$). As schematically illustrated in FIG. 3, the image detector 214 may communicate the image data to the control unit 210 which may be configured to decode images of the identifiers ($c_1$, $c_2$, $c'_3$, $c'_4$) to address data being unique for each data image 201, 202, 203, 204. The process applications (an, An) may be in communication with the image detector 214 to control the operation thereof, e.g. synchronizing the position the identifiers ($c_1$, $c_2$, $c'_3$, $c'_4$) on the packaging material 300 with the position of the image detector 214.

As elucidated above, the process parameters ($p_1$, $p_2$, $p_n$, $P_1$, $P_2$, $P_n$) may comprise mechanical characteristics, and/or electrical characteristics, and/or chemical characteristics, and/or motion profile characteristics of the packaging material 301, 302, 303, 304, and/or of the packaging units 301', 302', 303', 304', and/or of the first and/or second process application ($a_1$, $a_2$, $A_1$, $A_2$), and/or of the food to be filled in the packaging units 301', 302', 303', 304'. This provides for building the data images 201, 201, 203, 204, of the packaging units 301', 302', 303', 304', with a wide range of characteristics to be evaluated and utilized when optimizing numerous aspects of the application processes.

The process parameters ($p_1$, $p_2$, $p_n$, $P_1$, $P_2$, $P_n$) may also comprise image data of the packaging material 301, 302, 303, 304, and/or of the packaging units 301', 302', 303', 304'. The image date may be indicative of various types of deviations which can be utilized as control input to subsequent application processes to either compensate or correct for the deviations or take other actions such as discarding the affected packaging units.

The process parameters ($p_1$, $p_2$, $p_n$, $P_1$, $P_2$, $P_n$) may further comprise environmental parameters such as temperature, and/or humidity, of the environment of the first and/or second process application ($a_1$, $a_2$, $A_1$, $A_2$). This provides for optimizing process applications where such environmental parameters may affect the packaging material 301, 302, 303, 304.

The machine readable identifiers ($c_1$, $c_2$, $c'_3$, $c'_4$) may comprise a data pattern comprising printed elements such as data matrices and QR codes, and/or embossed elements, and/or magnetic elements and/or electromagnetic elements to be utilized in RFID communication.

Figure 4B:
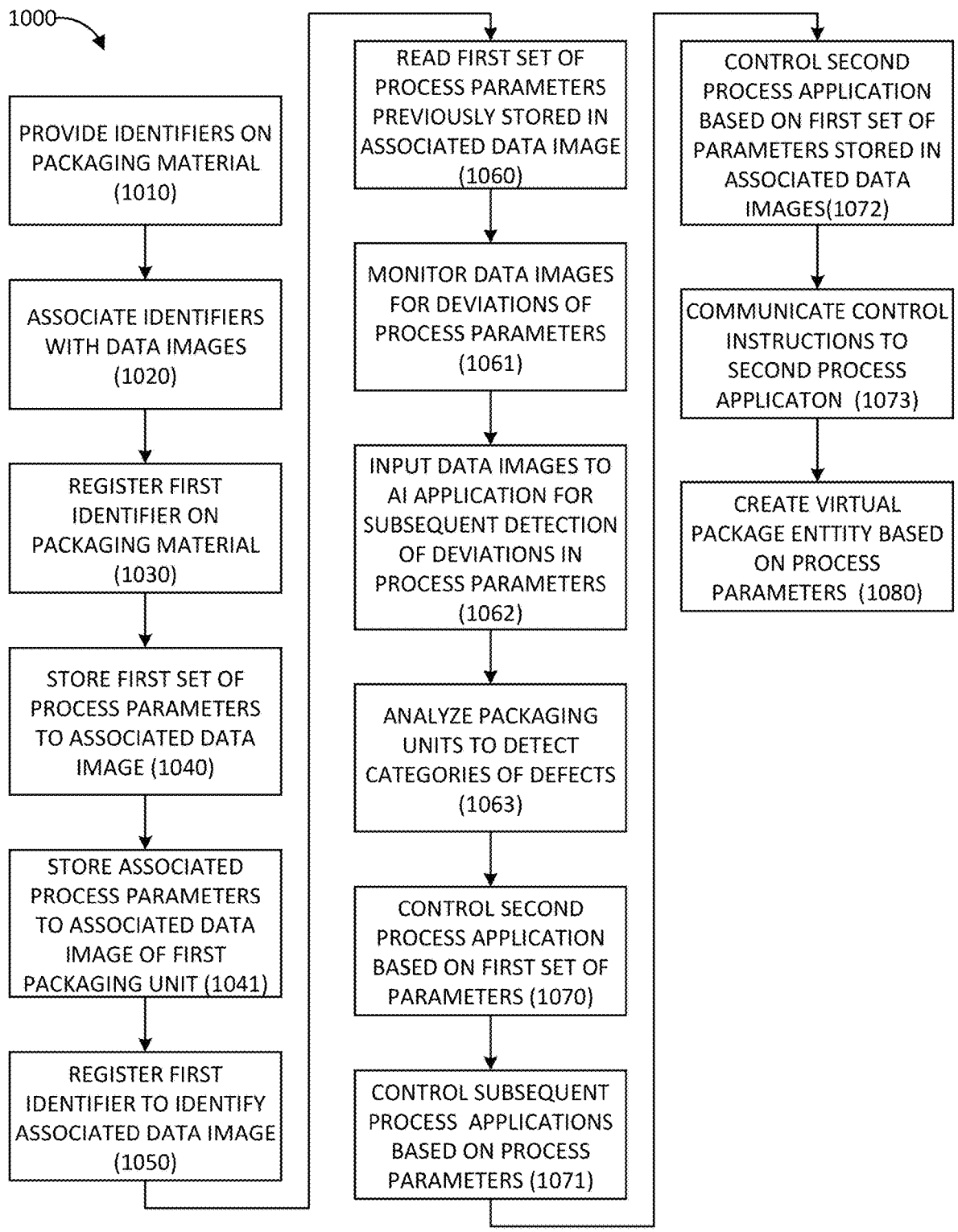
FIG. 4b is a further flowchart of a method of controlling a manufacturing process for packaging units.

FIG. 4b is another flowchart of the method 1000. For a plurality of process applications ($a_1$, $a_2$, $A_1$, $A_2$) to manipulate the packaging material 301, 303, from which the first packaging unit 301', 303', is manufactured, the method 1000 may comprise storing 1041 at least part of an associated plurality of process parameters ($p_1$, $p_2$, $P_1$, $P_2$) to the data image 201, 203, of the first packaging unit 301', 303'. The method 1000 may comprise controlling 1071 subsequent process applications ($a_n$, $A_n$), downstream of the plurality of process applications ($a_1$, $a_2$, $A_1$, $A_2$), based on at least part of the plurality of process parameters ($p_1$, $p_2$, $P_1$, $P_2$) stored in the data image 201, 203, of the first packaging unit 301', 303'. Hence, the data images 201, 203, may be enriched with a multitude of process parameters, e.g. as exemplified above, to be utilized for subsequent control input and manipulation of the packaging units 301', 303', on an individually customized basis.

The method 1000 may comprise creating 1080 a virtual packaging unit entity 215, 216, based on at least part of the plurality of process parameters ($p_1$, $p_2$, $P_1$, $P_2$).

The packaging unit entities 215, 216, may be accessed by a user for subsequent evaluation of the manufacturing process, both in terms of optimizing the processes as described above, and from an end-consumer perspective where the consumer may access an adapted version of the virtual packaging unit 215, 216, to see a chain of e.g. food origin and transport with data such as time stamps.

The method 100 may comprise controlling 1072 the second process application ($a_2$) for a series of packaging units 301', 302', based on at least part of first sets of process parameters ($p_1$, $p'_1$) stored, from the first process application ($a_1$), in associated data images 201, 202, of the series of packaging units 301', 302'. Hence, the second process application ($a_2$) may be continuously optimized for each packaging unit 301', 302', being received for manipulation by the second process application ($a_2$). The identifiers ($c_1$, $c_2$) may thus be registered in real-time for continuously accessing the related data images 201, 202, and the process parameters ($p_1$, $p'_1$) stored therein.

The method 1000 may comprise monitoring 1061 the data images 201, 202, 203, 204, for deviations from pre-determined criteria comprising the first set of process parameters ($p_1$, $P_1$). The pre-defined criteria may comprise defined thresholds of the process parameters ($p_1$, $P_1$). Different control actions may be defined depending on the detected deviations.

For example, the method 1000 may comprise communicating 1073 control instructions to the second process application ($a_2$, $A_2$) comprising modified process parameters based on such deviations. This provides for adjusting the second process application ($a_2$, $A_2$) to compensate for the deviations. This also provides for optimizing the detection of any defects. E.g. in case a deviation for a set of packaging units is detected, the set may be selected for a prioritized screening procedure to locate the origin of the deviation or defect. This allows for a facilitated quality control with optimization and prioritization for packaging units in a batch for which deviations where detected. Different categories such package integrity, package quality, and product quality may be assessed. Data from both the physical properties of the finished packaging units 301', 302', and the final data images 201, 202, may be evaluated for deviations. E.g. the data may contain information when the error/deviation has occurred, e.g. for which application.

The method 1000 may comprise analyzing 1063 the packaging units 301', 302', 303', 304', to detect categories of defects based on deviations as discussed above.

The method 1000 may comprise inputting 1062 the data images 201, 202, 203, 204, to an artificial intelligence application for subsequent detection 1063 of deviations in the process parameters. Based on combinations of packaging unit data in the associated images 201, 202, in some examples in combination with physical appearance, such application may be trained on how to adapt the manufacturing parameters for different scenarios, so that a pattern of how to recognize and develop/adjust the parameters can be learned, e.g. by extrapolating from the scenarios during learning phase. Such process can be applied to any point in the process line. The AI application of the relevant machine can thus continuously evaluate the result of process carried out and adapt its set of process parameters. This is enabled by the unique tracing of individual packaging units 301', 302', 303', 304', by building associated data images 201, 202, 203, 204, as described above. Machine hierarchy may be taken into account. E.g. the machine may at a higher level evaluate each process application as an ability, analogous to a type of skill, where each skill may be evaluated and possibly prioritized for optimization to increase the overall throughput. The artificial intelligence application may comprise a machine learning-based model.

A computer program product is provided comprising instructions which, when the program is executed by a computer, cause the computer to carry out the steps of the method 1000 as described above.

A packaging machine is provided comprising a system 200 as described above in relation to FIGS. 1-3, and/or performing the method 1000.

From the description above follows that, although various embodiments of the invention have been described and shown, the invention is not restricted thereto, but may also be embodied in other ways within the scope of the subject-matter defined in the following claims.

The invention claimed is:

1. A method of controlling a manufacturing process for a plurality of packaging units for food, the method comprising, by a control unit:
associating a plurality of machine readable identifiers on a plurality of packaging materials for the plurality of packaging units with a plurality of data images of the plurality of packaging units, whereby for the plurality of packaging units, to be manufactured from the plurality of packaging materials, each packaging unit has a corresponding data image being identifiable by an associated identifier on a corresponding packaging material of the plurality of packaging materials,
for a first process application of a plurality of process applications to manipulate a first packaging material of the plurality of packaging materials from which a first packaging unit is manufactured based on a first set of process parameters:
registering a first identifier of the plurality of machine readable identifiers on said first packaging material to be manipulated to identify a first associated data image of the plurality of data images, and
storing at least part of the first set of process parameters to the first associated data image for enriching the first associated data image,
for a subsequent second process application of the plurality of process applications to manipulate said first packaging material from which the first packaging unit is manufactured:
registering the first identifier to identify the enriched first associated data image to again access the enriched first associated data image further downstream in the subsequent second process application,
reading at least part of the first set of process parameters stored in said enriched first associated data image,
monitoring the plurality of data images for one or more deviations from a pre-determined criteria comprising said first set of process parameters,
communicating one or more control instructions to the subsequent second process application, the one or more control instructions comprising the first set of process parameters modified based on said one or more deviations,
controlling the subsequent second process application based on at least part of the first set of process parameters modified based on said one or more deviations,
storing at least part of a second set of process parameters, associated with the second process application, to the first associated data image, and
controlling process applications of the plurality of process applications downstream of said first and second of process applications, based on at least part of the first and second sets of process parameters stored in the first associated data image, and
for the downstream process applications to manipulate said first packaging material from which the first packaging unit is manufactured, storing at least part of an associated plurality of process parameters to the first associated data image.

2. The method according to claim 1, further comprising:
creating a virtual packaging unit entity based on at least part of said plurality of process parameters to be accessed by a user for subsequent evaluation of the manufacturing process.

3. The method according claim 1, further comprising:
controlling the second process application for a series of packaging units based on at least part of the first set of process parameters.

4. The method according to claim 1, further comprising:
inputting the plurality of data images to an artificial intelligence application for subsequent detection of said one or more deviations.

5. The method according to claim 1, further comprising:
analyzing said plurality of packaging units to detect categories of defects based on said one or more deviations.

6. A system for controlling a manufacturing process for a plurality of packaging units for a liquid food, wherein the plurality of packaging units are manufactured from a plurality of packaging materials comprising a plurality of machine readable identifiers, the system comprising:
a control unit configured to:
associate the plurality of machine readable identifiers with a plurality of data images of the plurality of packaging units, whereby for the plurality of packaging units, to be manufactured from the plurality of packaging materials, each packaging unit has a corresponding data image being identifiable by an associated identifier on a corresponding packaging material of the plurality of packaging materials,
for a first process application of a plurality of process applications to manipulate a first packaging material of the plurality of packaging materials from which a first packaging unit is manufactured based on a first set of process parameters:
register a first identifier of the plurality of machine readable identifiers on said first packaging material to be manipulated to identify a first associated data image of the plurality of data images, and
store at least part of the first set of process parameters to the first associated data image for enriching the first associated data image, and
for a subsequent second process application of the plurality of process applications to manipulate said first packaging material from which the first packaging unit is manufactured:
register the first identifier to identify the enriched first associated data image to again access the enriched first associated data image further downstream in the subsequent second process application,
read at least part of the first set of process parameters stored in said enriched first associated data image,
monitor the plurality of data images for one or more deviations from a pre-determined criteria comprising said first set of process parameters,
communicate one or more control instructions to the subsequent second process application, the one or more control instructions comprising the first set of process parameters modified based on said one or more deviations, control the subsequent second process application based on at least part of the first set of process parameters modified based on said one or more deviations, store at least part of a second set of process parameters, associated with the second process application, to the first associated data image, and control process applications of the plurality of process applications downstream of said first and second of process applications, based on at least part of the first and second sets of process parameters stored in the first associated data image, and for the downstream process applications to manipulate said first packaging material from which the first packaging unit is manufactured, store at least part of an associated plurality of process parameters to the first associated data image.

7. The system according to claim 6, further comprising an image detector in communication with the control unit and being configured to register image data of the plurality of packaging materials to detect the plurality of machine readable identifiers.

8. The system according to claim 6, wherein the first set of process parameters comprise at least one of mechanical characteristics, electrical characteristics, chemical characteristics, or motion profile characteristics of at least one of the plurality of packaging materials, the plurality of packaging units, the first process application, the subsequent second process application, or the liquid food.

9. The system according to claim 6, wherein the first set of process parameters comprise image data of at least one of the plurality of packaging materials or of the plurality of packaging units.

10. The system according to claim 6, wherein the first set of process parameters comprise environmental parameters of at least one of the first process application or the subsequent second process application.

11. The system according to claim 6, wherein the plurality of machine readable identifiers comprise a data pattern comprising at least one of printed elements, embossed elements, magnetic elements, or electromagnetic elements.

12. A non-transitory computer storage medium program product comprising instructions which, when executed by a computer, cause the computer to carry out the method according to claim 1.

13. A packaging machine comprising the system according to claim claim 6.

14. A packaging machine performing the method according to claim 1.

* * * * *

UNITED STATES PATENT AND TRADEMARK OFFICE
CERTIFICATE OF CORRECTION

| | | |
|---|---|---|
| PATENT NO. | : 11,639,243 B2 | Page 1 of 2 |
| APPLICATION NO. | : 17/282189 | |
| DATED | : May 2, 2023 | |
| INVENTOR(S) | : Paolo Scarabelli | |

It is certified that error appears in the above-identified patent and that said Letters Patent is hereby corrected as shown below:

In the Specification

Column 5, Line 29, delete "$c'_a$)." and insert -- $c'_4$). --.

Column 5, Line 30-67 through Column 6, Line 1-8, delete "The control unit 210 is configured to associate 1020 the identifiers ($c'_3$, $c'_4$) with corresponding data images 203, 204, of the packaging units 303', 304'. Thus, each packaging unit 303', 304', has a corresponding data image 203, 204, being identifiable by an associated identifier ($c'_3$, $c'_4$). A first process application ($A_1$) manipulates the packaging material 303 from which a first packaging unit 303' is manufactured based on a first set of process parameters ($P_1$). The control unit 210 is configured to register 1030 a first identifier ($c'_3$) on the packaging material 303 to be manipulated to identify the associated data image 203, and store 1040 at least part of the first set of process parameters ($P_1$) to the associated data image 203. For a subsequent second process application ($A_2$) to manipulate said packaging material 303, the control unit 210 is configured to register 1050 the first identifier ($c'_3$) to identify the associated data image 203, and read 1060 at least part of the first set of process parameters ($P_1$) stored in said associated data image 203 to control 1070 the second process application ($A_2$) based on at least part of the first set of process parameters ($P_1$). As described in relation to FIG. 1, the data images 203 are enriched with process parameters ($P_1$, $P_2$) of the process applications ($A_1$, $A_2$). Thus, the process parameters ($P_1$, $P_2$) are accessible in the data images 203 for each unique packaging unit 303' to dynamically control subsequent process applications ($A_n$), allowing for continuously and autonomously compensating and optimizing the manufacturing line. The process applications ($A_n$) for a packaging unit 303' of a secondary packaging material 303 may be controlled based on control instructions comprising process parameters ($P_n$) as well as process parameters ($p_n$) of the individual packaging units 301'. In one example the latter process parameters ($p_n$) may comprise data of the dimensions of the individual units 301', which can be used as input to a subsequent process application ($A_n$) to adjust the dimensions of the secondary packaging material 303 accordingly. The data images 203, 204, may be enriched with new data throughout the entire manufacturing chain, including the distribution steps. Hence, in addition to provide for continuously evaluating and optimizing of the packaging units 301', 303', 304', on respective individual basis in real-time during the manufacturing steps, it is provided for improved post-manufacturing analysis based on comprehensive data sets. This allows for further optimization Signed and Sealed this
Eighth Day of August, 2023

*Katherine Kelly Vidal*
Katherine Kelly Vidal
*Director of the United States Patent and Trademark Office* and on a multitude of process levels, such performance of complete manufacturing lines, aggregates of processes, as well as traceability to individual processes or parts of machines." and insert the same on Column 5, Line 29, as a continuation of the same paragraph.

Column 5, Line 59, delete "$(p_1)$" and insert -- $(p_n)$ --.

Column 5, Line 61, delete "$(p_1)$" and insert -- $(p_n)$ --.

Column 7, Line 5, delete "(an, An)" and insert -- $(a_n, A_n)$ --.

Column 7, Line 26, delete "date" and insert -- data --.

Column 7, Line 63-67 through Column 8, Line 1-2, delete "The packaging unit entities 215, 216, may be accessed by a user for subsequent evaluation of the manufacturing process, both in terms of optimizing the processes as described above, and from an end-consumer perspective where the consumer may access an adapted version of the virtual packaging unit 215, 216, to see a chain of e.g. food origin and transport with data such as time stamps." and insert the same on Column 7, Line 62, as a continuation of the same paragraph.

In the Claims

Column 12, Line 22, Claim 13, delete "claim claim" and insert -- claim --.